(No Model.) 2 Sheets—Sheet 1.

R. MAZZA.
HORSE TAMING APPARATUS.

No. 484,216. Patented Oct. 11, 1892.

Witnesses:
Inventor,
Ralph Mazza
By Dewey & Co.
Attys (No Model.) 2 Sheets—Sheet 2.

R. MAZZA.
HORSE TAMING APPARATUS.

No. 484,216. Patented Oct. 11, 1892.

Witnesses:
G. H. Annse
J. A. Bayless

Inventor,
Raeph Mazza
By Dewey & Co.
Attys

UNITED STATES PATENT OFFICE.

RALPH MAZZA, OF NILES, CALIFORNIA.

HORSE-TAMING APPARATUS.

SPECIFICATION forming part of Letters Patent No. 484,216, dated October 11, 1892.

Application filed January 15, 1892. Serial No. 418,183. (No model.)

*To all whom it may concern:*

Be it known that I, RALPH MAZZA, a citizen of the United States, residing at Niles, Alameda county, State of California, have invented an Improvement in Horse-Taming Apparatus; and I hereby declare the following to be a full, clear, and exact description of the same.

My invention relates to an apparatus to be used for making horses, mules, oxen, and other animals tame and gentle.

It consists of a padded box or stall of sufficient size to contain the horse or other animal and mounted upon a vertical axis, so that it can be rotated around said axis, and in certain connections and details of construction, which will be more fully explained by reference to the accompanying drawings, in which—

Figure 1:
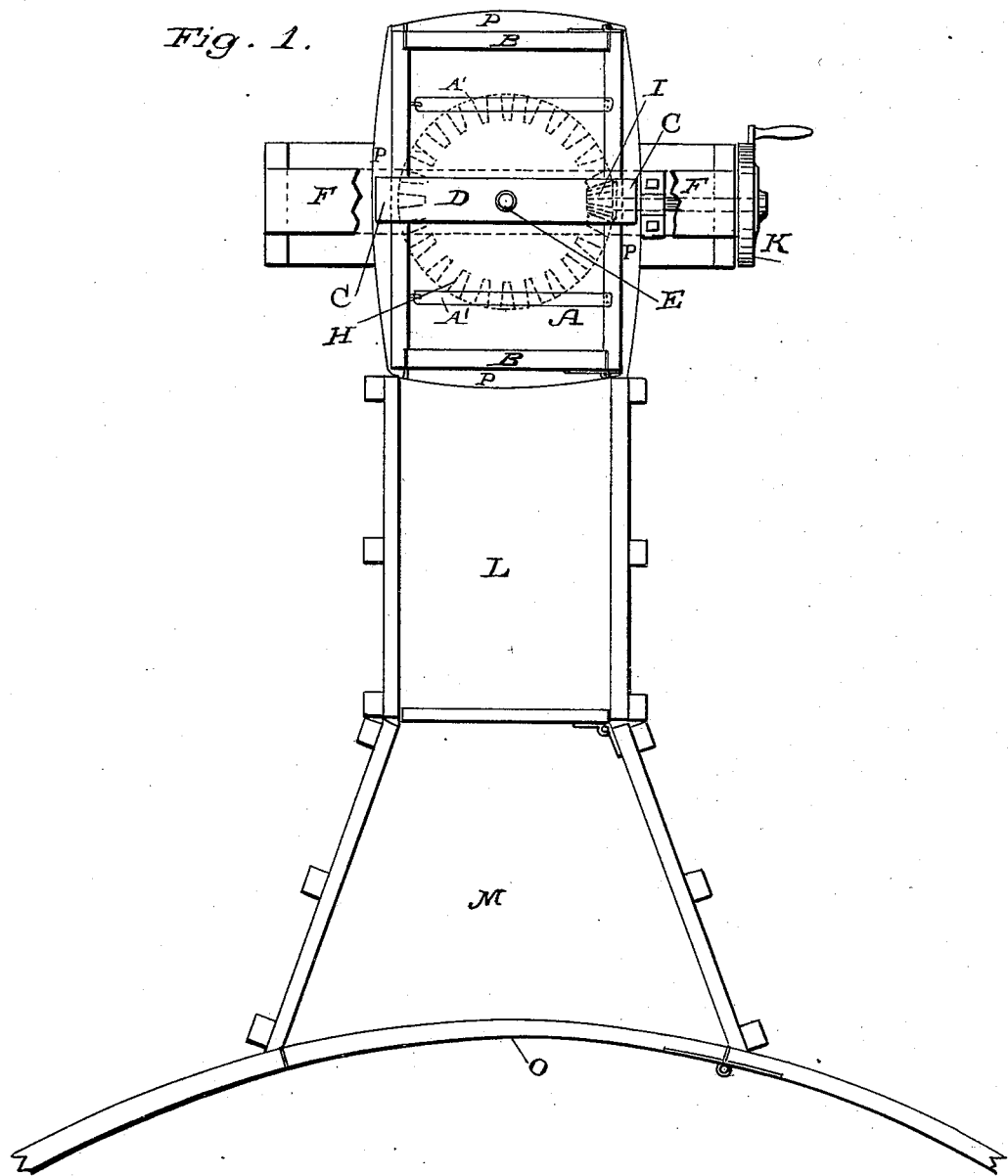
Figure 2:
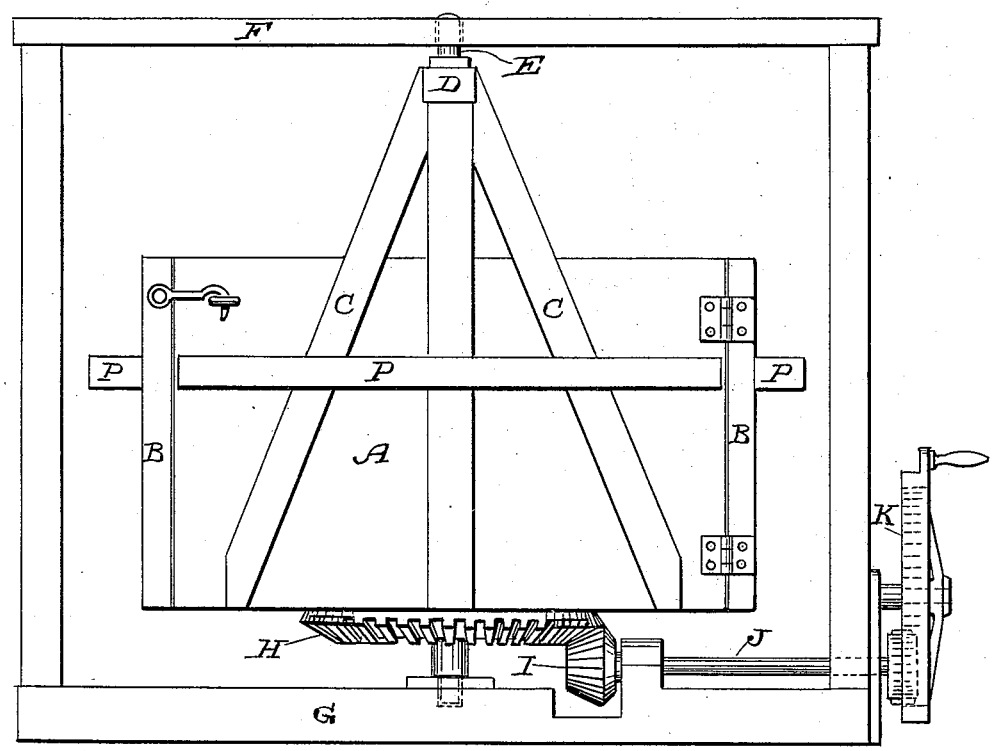

Figure 1 is a view of my apparatus. Fig. 2 is a side view of the box or stall and its operating mechanism.

For the purpose of effectually taming young or vicious horses or other animals, to enable the operator to handle them with safety to put on the halter, bridle, or harness, to hitch them up to a cart or wagon, and in various ways render them fit for ordinary uses, I have devised an apparatus by which the animal may be rapidly reduced to such a condition that these various operations may be carried on before he is able to protest by any of the usual means adopted by animals.

In order to carry out my invention, I employ a box or stall A of sufficient length, height, and width to allow an animal to pass into it and to prevent his jumping out after he is in. The sides may be as high or higher than the animal's head, if necessary, and they are padded all about, so that the animal cannot injure himself. This stall has doors B B at its opposite ends, with suitable clasps or fastenings by which they are retained in a closed position, so that the animal is entirely shut in when once inside the box. If desired, straps A' may be fixed across the top of the box to prevent the animal from rearing or kicking up. The sides of the box are strengthened and supported by the timbers C C, which extend from the bottom near the ends, converging toward the top, as shown, and meeting vertical central timbers, which are also fastened to the sides, as shown. Across the top, connecting these timbers C C, is a stout timber D, which is sufficiently above the top of the box to allow an animal to go in and out freely and to prevent his hitting it if he becomes unruly while in the box. From the center of this timber D a stout spindle E projects upwardly and fits into a journal in the cross-timber of the frame F above. From the bottom of the box a similar spindle projects downwardly, fitting into a step upon the bottom timber or floor G, so that the box may be turned around this vertical axis by any suitable means. It will be manifest that the box could be turned by hand, if desired; but in the present case I have shown a gear-wheel H fixed to the bottom of the box and engaged by a pinion I upon the horizontal shaft J, which extends outwardly through supporting-timbers to a point beyond the circle of rotation of the box. Upon the outer end of this shaft is a crank-wheel or other driving device K, through which motion may be conveyed to rotate the box.

L is a narrow passage-way approximately the same width as the box, and M is a diverging entrance-way extending outwardly from this passage. A door may be placed between these two passages, if desired, to shut the animal into the inner one after he has entered.

The outer and diverging ends of the entrance-way M connect with the paddock or corral in which the animals are kept. This inclosure is preferably circular in form for purposes of training and for other reasons, and it has a gate O, corresponding in shape with the interior of the inclosure and serving to close the entrance-way M. When this gate is open, it stands at such an angle that the animal being driven around the interior of the inclosure and arriving at this point will be directed into the entrance-way M and the narrow passage-way L. The end of the passage-way L corresponds with the end of the box A when the latter is in line with the passage-way, and the gate B adjacent to the passage-way being opened leaves a direct communication from the main inclosure into the box. The gate at the opposite end of the box will be kept closed, and the animal upon which it is desired to operate, being driven into the passage-way, will eventually pass into the box when the gate B is closed behind him and he is unable to get out either forward or backward. The apparatus is then rotated upon its vertical axis with as much speed and for as many revolutions as may be found necessary. This varies with different animals. Some animals are made so dizzy as to fall down with a few revolutions, while others cannot be overcome until the apparatus has been rotated a great number of times and at considerable speed. The object is not to cause the animal to fall down, but to make him sufficiently dizzy to temporarily deprive him of the power to resist.

Around the sides of the box I have fitted narrow platforms P, upon which the operator can walk around for the purpose of putting on such harness as he may desire to apply to the animal. While the animal is in this condition a halter or any portion of a harness may be put upon him. If it is found that he is not sufficiently docile, the box may be still further rotated until he is reduced to the proper condition of submission. The box is then turned so that the door in front of the animal is in line with the passages L and M, and the animal is then driven out into the circular inclosure, where he may be driven around in either direction after the gate is closed and the various steps necessary for making him accustomed to harness and vehicle carried out. It will be found that by this operation the animal will be rendered so docile that he can be harnessed, attached to the cart, and driven with very little difficulty.

This apparatus enables the operator to tame an animal and render him gentle without any violent or cruel treatment.

Having thus described my invention, what I claim as new, and desire to secure by Letters Patent, is—

1. An apparatus for taming animals, consisting of a box rotatable about a vertical axis, doors at opposite ends of the box for the admission and egress of the animal, a passage-way extending from the box to the inclosure, and a gate in said passage-way cutting off the same from the inclosure, whereby the animal is confined within the passage-way, from which he is driven into the box, substantially as herein described.

2. An apparatus for taming animals, consisting of the box having doors at opposite ends, a supporting and strengthening framework upon the sides and a cross-bar over the top and center of the box, with the vertical shaft or spindle and journal-box within which it turns, a spindle in line therewith projecting from the bottom and a step within which it turns, beveled gear-wheels secured to the bottom of the box, and a horizontal shaft having a pinion at one end, engaging the teeth of the gear-wheel upon a box, and a crank-shaft at the opposite end, by which it is rotated and the box turned in either direction, substantially as herein described.

In witness whereof I have hereunto set my hand.

RALPH MAZZA.

Witnesses:
S. H. NOURSE,
J. A. BAYLESS.